May 23, 1950

A. G. ZICOVICH 2,508,633

CONCRETE MIXER

Filed Oct. 25, 1947

INVENTOR
Anthony G. Zicovich
BY
ATTORNEY

May 23, 1950 A. G. ZICOVICH 2,508,633
CONCRETE MIXER

Filed Oct. 25, 1947 2 Sheets-Sheet 2

INVENTOR
Anthony G. Zicovich
BY Harper Allen
ATTORNEY

Patented May 23, 1950

2,508,633

UNITED STATES PATENT OFFICE 2,508,633

CONCRETE MIXER

Anthony G. Zicovich, San Jose, Calif., assignor of one-half to Arthur W. Caldwell, San Jose, Calif.

Application October 25, 1947, Serial No. 782,094

8 Claims. (Cl. 259—161)

The present invention relates to batch plants of the type employing pre-mixers for concrete and is concerned more particularly with the improved apparatus having an advantageous arrangement of the feed chutes for use in delivering aggregate and cement to trucks and to the pre-mixer selectively.

In the installation of pre-mixers in existing batch plants or in the erection of batch plants to incorporate a pre-mixer, it is desirable to maintain a reduced height of the batch plants above the truck runway because of the considerable savings involved in alteration and construction.

In accordance with the instant invention, the problem of height is minimized by the use of selectively operable discharge chutes for cooperation with the discharge outlet of the batch plant, so that one chute is employed when the batch plant is delivering directly to a truck and another chute is used for feeding the pre-mixer. The placing of one feed chute or the other in operative relation to the discharge outlet is effected automatically by the adjustment of the pre-mixer to and from loading and discharging positions.

The above and other objects and advantages of the invention will be apparent from the following description of a preferred embodiment of the invention, as illustrated in the accompanying drawing, in which.

Figure 1:
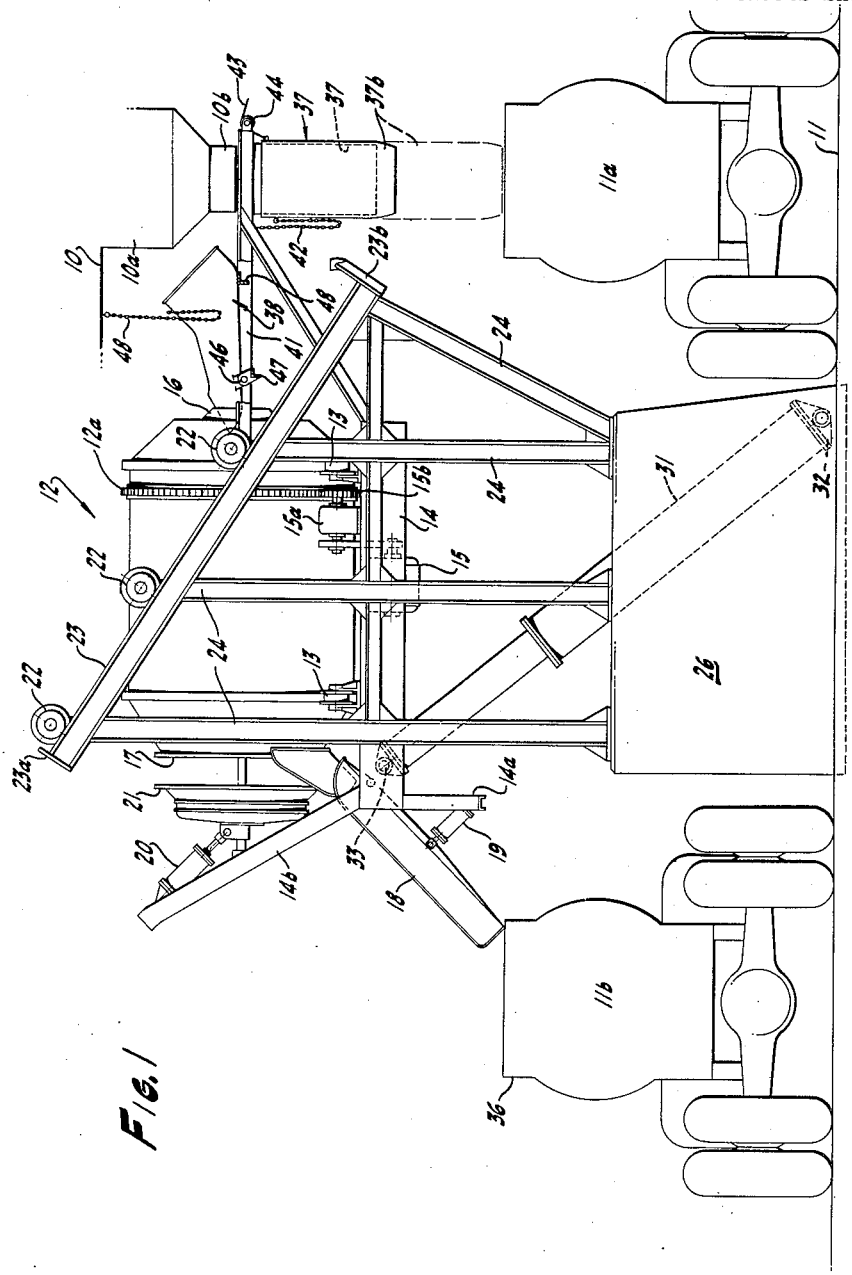
Figure 1 is a side elevational view of a batch plant pre-mixer installation with the pre-mixer shown in its discharging position.
Figure 2:
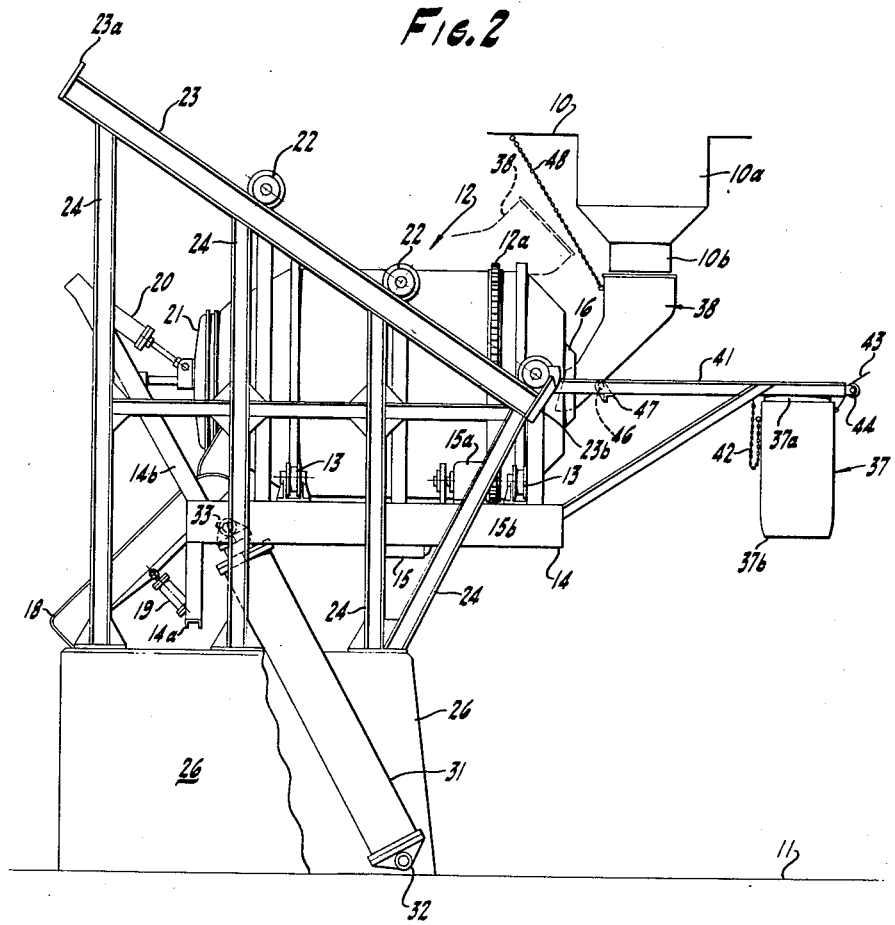
Figure 2 is a view similar to Figure 1 showing the pre-mixer in its charge receiving or loading position.

Figures 1 and 2 show a batch plant pre-mixer installation of the general type disclosed and claimed in my copending application Serial No. 728,682, filed February 14, 1947, for Concrete mixers. The batch plant 10 may include a conventional arrangement of bins (not shown) for selective delivery of different types of aggregate, cement and water to a discharge hopper 10a which terminates in a cylindrical end portion 10b forming the discharge outlet of the batch plant. The discharge outlet is spaced above the ground level 11 to provide a truck station at 11a so that trucks can be driven directly below the discharge means for delivery of material thereto.

Associated with the bin structure 10 there is provided a pre-mixer installation comprising a mixer 12 of conventional construction. The mixer 12 includes a rotary drum supported by the rollers 13 on a frame 14 which may also mount suitable drive means for the drum of the mixer. The drive means illustrated is an electric motor 15 suitably connected through a gear box 15a and a drive gear 15b to a large drive gear 12a on the mixer. The mixer 12 is provided with an intake opening 16 at one end thereof, and discharge means 17 at the other end thereof leading to a downwardly extending discharge chute 18. The chute 18 may be adjusted by means of a pneumatic or hydraulic cylinder mechanism 19 pivoted to a depending portion 14a of the frame 14 and pivotally connected to the chute 18. The discharge end of the mixer 12 is provided with a conventional form of closure 21 which can be moved from the closed position shown in Figure 2 to the open position shown in Figure 1 by operation of the pneumatic or hydraulic cylinder mechanism 20 pivotally connected thereto and also pivoted on an extension 14b of the frame 14.

To provide for movement of the mixer from its lower position shown in Figure 2 to an elevated position shown in Figure 1, the mixer frame 14 is provided at each side with three rollers 22 which engage an associated inclined track 23 having limit stops 23a and 23b at the ends thereof. Each of the tracks 23 is supported by suitable frame structure such as the I-beams 24 from an associated base or support structure 26, which is shown, or may take the form of a concrete foundation structure which is located at one side of the truck station 11a and has at its other side a second truck station 11b. A truck at the station 11b is positioned to receive pre-mixed concrete from the mixer 12.

The operating means for effecting controlled movement of the mixer 12 along its tracks 23 may include a pneumatic or hydraulic cylinder mechanism 31 pivotally mounted at its lower end in a transverse bearing structure 32 between the foundation portions 26 of the support structure and pivotally connected at their upper ends to a transverse shaft 33 secured in the respective side portions of the frame 14.

The controls for the electric motor 15 and the cylinder mechanisms 19, 20 and 31 are located at an operator's station which is preferably the operator's station of the batch plant.

The operator, therefore, by operation of the pneumatic or hydraulic mechanism 31, can move the mixer 12 along the tracks 23 from its lower or charge receiving position shown in Figure 2 to an upper or discharge position (Figure 1) where the discharge chute 18 is disposed above a truck 36 at the truck station 11b.

A pair of selectively operable discharge chutes 37 and 38 are carried by a generally rectangular framework 41 extending outwardly from the loading end of the mixer 12. The discharge chute 37 is preferably of a telescoping or extensible type and has its upper portion 37a secured adjacent the outer end of the framework 41 so that when the mixer is in the elevated position shown in Figure 1 the upper chute portion 37a mates with the lower end of the outlet 10b. The lower portion 37b of the chute is connected by a stop chain 42 to the frame 41 to limit its extended or down position. To control the adjustment of the lower chute portion 37b, a cable 43 is connected thereto and extends over a sheave 44 on the frame 41. The end of the cable 43 is attached to a suitable counterweight so that the truck operator or workman can lower the movable portion 37b of the discharge chute into operative engagement with the truck as shown in dotted lines in Figure 1.

The feed chute 38 for the mixer 12 is pivoted at 46 on a cross-angle 47 of the frame 41, and is adapted in its inactive position to rest freely on another cross angle 48 of the frame 41. The feed chute has its discharge end positioned within the feed opening 16 of the mixer. To control pivoting of the chute 38 to engage its upper end with the discharge outlet 10b, a chain 48 extends between the upper end of the chute 38 and the batch plant structure 10. As the pre-mixer is lowered from the position shown in Figure 1 to the position shown in Figure 2, the feed chute 38 moves downwardly with the mixer along its inclined path until the chain 48 becomes taut and starts the pivoting of the feed chute above its support axis 46. During the continuing movement of the mixer, the feed chute 38 moves into engagement with the discharge outlet 10b to connect it with the feed opening 16 of the mixer 12.

From the above description it will be seen that the double chute arrangement carried by the pre-mixer 12 automatically conditions the discharge outlet 10b of the batch plant to deliver material to the proper location as controlled by the adjustment of the pre-mixer to and from its loading position.

While I have shown and described certain preferred embodiments of the invention, it is apparent that the invention is capable of variation and modification from the forms shown so that its scope should be limited only by the scope of the claims appended hereto.

I claim:

1. In a batch plant having a discharge outlet for aggregate and cement, a concrete mixer, means mounting said mixer for bodily movement between a lower loading position and an upper discharging position, and a pair of feed chutes mounted in spaced relation for movement with said mixer and positioned respectively in alignment with said discharge outlet in the loading and discharging positions of said mixer, one of said chutes being connected to the intake opening of the mixer and the other chute being operative with respect to a truck below said discharge outlet.

2. In a batch plant having a discharge outlet for aggregate and cement, a concrete mixer, means mounting said mixer for bodily movement between a lower loading position and an upper discharging position, a pair of feed chutes mounted in spaced relation for movement with said mixer and positioned respectively in alignment with said discharge outlet in the loading and discharging positions of said mixer, one of said chutes being connected to the intake opening of the mixer and normally mounted with respect to said mixer and said discharge outlet, and the other chute being operative with respect to a truck below said discharge outlet, and means for controlling movement of said one chute to and from operative relation with respect to said discharge outlet during movement of said mixer.

3. In a batch plant having a discharge outlet for aggregate and cement, a concrete mixer, means mounting said mixer for bodily movement between a lower loading position and an upper discharging position, an auxiliary frame projecting outwardly from the feed end of the mixer, and a pair of feed chutes mounted in spaced relation on said auxiliary frame for movement with said mixer and positioned respectively in alignment with said discharge outlet in the respective loading and discharging positions of said mixer, one of said chutes being connected to the intake opening of the mixer and the other chute being operative with respect to a truck below said discharge outlet.

4. In a batch plant having a discharge outlet for aggregate and cement, a concrete mixer, means mounting said mixer for bodily movement between a lower loading position and an upper discharging position, and a pair of feed chutes mounted in spaced relation for movement with said discharge outlet in the respective loading and discharging positions of said mixer, one of said chutes being connected to the intake opening of the mixer in the lowermost loading position of said mixer and the other of said chutes being operative with respect to said discharge outlet in the uppermost discharging position of said mixer for discharging of material into a truck below said discharge outlet.

5. In a batch plant having a discharge outlet for aggregate and cement, a concrete mixer, means mounting said mixer for movement substantially along an inclined plane between a lowermost loading position and an uppermost discharging position, and a pair of feed chutes mounted in spaced relation for movement with said mixer and positioned respectively in alignment with said discharge outlet in the respective loading and discharging positions of said mixer, one of said chutes being connected to the intake opening of the mixer and having a pivoted mounting thereon for movement to engage said discharge outlet in the lowermost position of said mixer, and the other chute being operative with respect to said discharge outlet in the uppermost position of said mixer for discharging of material into a truck below said discharge outlet.

6. In a batch plant having a discharge outlet for aggregate and cement, a concrete mixer, means mounting said mixer for movement substantially along an inclined plane between a lowermost loading position and an uppermost discharging position, a pair of feed chutes mounted in spaced relation for movement with said mixer and positioned respectively in alignment with said discharge outlet in the respective loading and discharging positions of said mixer, one of said chutes being connected to the intake opening of the mixer and having a pivoted mounting thereon for movement to engage said discharge outlet in the lowermost position of said mixer and the other chute being operative with respect to said discharge outlet in the uppermost position of said mixer for discharging of material into a truck below said discharge outlet, and a connection from said one pivoted chute to said batch plant for controlling pivoting movement thereof to and from operative relation with respect to said discharge outlet during movement of said mixer.

7. In a batch plant having a discharge hopper for aggregate and cement, a concrete mixer at one side of said plant, a truck station below said hopper at one side of said mixer, and a second truck station at the opposite side of said mixer; means mounting said mixer for movement between a discharge position in operative relation to a truck at said second station and a charge receiving position in operative relation to said hopper, a framework carried by said mixer, a truck feed chute of extensible construction on said framework for alignment with said hopper with said mixer in its discharging position, a mixer feed chute pivotally mounted on said framework for alignment with said discharge hopper in the charge receiving position of said mixer, and a controlling connection between said mixer feed chute and said hopper to cause pivoting of said mixer feed chute to engage said discharge outlet upon movement of said mixer to its charge receiving position.

8. In a batch plant having a discharge hopper for aggregate and cement, a concrete mixer at one side of said plant, a truck station below said hopper at one side of said mixer, and a second truck station at the opposite side of said mixer; means mounting said mixer for movement between an upper discharge position in operative relation to a truck at said second station and a lower charge receiving position in operative relation to said hopper, a framework carried by said mixer, a truck feed chute of extensible construction on said framework for alignment with said hopper with said mixer in its discharging position, and a mixer feed chute on said framework for alignment with said discharge hopper in the charge receiving position of said mixer, said framework and said respective feed chutes being movable with said mixer during its movement between its respective upper and lower positions.

ANTHONY G. ZICOVICH.

REFERENCES CITED

The following references are of record in the file of this patent:

UNITED STATES PATENTS

| Number | Name | Date |
| --- | --- | --- |
| 304,259 | Brunton | Aug. 26, 1884 |
| 1,264,732 | Williams | Apr. 30, 1918 |
| 1,827,713 | Eggert | Oct. 13, 1931 |
| 2,264,039 | Hoya | Nov. 25, 1941 |